(12) United States Patent
Ishizeki et al.

(10) Patent No.: US 11,618,301 B2
(45) Date of Patent: Apr. 4, 2023

(54) VEHICLE AIR CONDITIONER

(71) Applicant: SANDEN AUTOMOTIVE CLIMATE SYSTEMS CORPORATION, Gunma (JP)

(72) Inventors: Tetsuya Ishizeki, Gunma (JP); Megumi Shigeta, Gunma (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 79 days.

(21) Appl. No.: 17/273,613

(22) PCT Filed: Aug. 8, 2019

(86) PCT No.: PCT/JP2019/031364
§ 371 (c)(1),
(2) Date: Mar. 4, 2021

(87) PCT Pub. No.: WO2020/059353
PCT Pub. Date: Mar. 26, 2020

(65) Prior Publication Data
US 2021/0362565 A1  Nov. 25, 2021

(30) Foreign Application Priority Data

Sep. 21, 2018 (JP) .............................. JP2018-177216

(51) Int. Cl.
*B60H 1/00* (2006.01)
(52) U.S. Cl.
CPC .................... *B60H 1/00921* (2013.01); *B60H 2001/00928* (2013.01); *B60H 2001/00949* (2013.01); *B60H 2001/00957* (2013.01)

(58) Field of Classification Search
CPC ...... B60H 1/00921; B60H 2001/00928; B60H 2001/00949; B60H 2001/00957
USPC ......................................................... 165/202
See application file for complete search history.

(56) References Cited

U.S. PATENT DOCUMENTS 5,839,656 A    11/1998  Yamano et al.
2014/0041826 A1  2/2014  Takeuchi et al.

FOREIGN PATENT DOCUMENTS

| JP | H10-12286 A | 1/1998 |
| JP | 2017-154522 A | 9/2017 |
| JP | 2019206216 | * 12/2019 |
| WO | 2012-144151 A1 | 10/2012 |

OTHER PUBLICATIONS

International Search Report dated Oct. 15, 2019 issued in PCT/JP2019/031364.

* cited by examiner

*Primary Examiner* — Davis D Hwu
(74) *Attorney, Agent, or Firm* — Pearne & Gordon, LLP

(57) ABSTRACT

Provided is a vehicle air conditioning device that can save the space for installing constituent apparatuses of a vehicle by using a heater for multiple purposes and reduce the manufacturing cost. Heating assisting operation for heating air to be supplied into a cabin is performed in a manner that a heat medium heated by a heat medium heater 32 in a heat medium circuit 30 flows to a heat medium radiator 16 without flowing on a battery B side while heating operation is performed.

5 Claims, 2 Drawing Sheets

VEHICLE AIR CONDITIONER

TECHNICAL FIELD

The present invention relates to a vehicle air conditioning device that can be used for a vehicle including an apparatus whose temperature needs to be adjusted during the use, such as a battery that supplies electric power to an electric motor for travel.

BACKGROUND ART

This type of vehicle air conditioning device has conventionally employed a refrigerant circuit including a compressor, an indoor heat exchanger, an outdoor heat exchanger, and an expansion valve, and a cabin of the vehicle is cooled, heated, dehumidified, and so on by supplying the air that has exchanged heat with a refrigerant in the indoor heat exchanger. When the heating load is large, the heat radiation necessary to make the air in the cabin have the set temperature may be insufficient, and in view of this, the vehicle air conditioning device includes an auxiliary heater that compensates for the lack of heat radiation.

In addition, some vehicles including the vehicle air conditioning device include an apparatus whose temperature needs to be adjusted during the use, such as a battery that supplies the electric power to an electric motor as a driving source. Examples of such vehicles include an electric vehicle and a hybrid vehicle.

Therefore, in some of such vehicles that have been known, constituent apparatuses of the vehicle whose temperature needs to be adjusted are connected to a heat medium circuit, a heat medium flowing in the heat medium circuit is heated by a heat medium heater, and by the heated heat medium, a temperature control object apparatus is heated (for example, see Patent Literature 1).

CITATION LIST

Patent Literature

Patent Literature 1: JP-A-10-12286

SUMMARY OF THE INVENTION

Problems to be Solved by the Invention

The aforementioned vehicle needs a plurality of heaters including the auxiliary heater for the vehicle air conditioning device and the heat medium heater for the heat medium circuit. Thus, the vehicle needs to have a space enough to install the heaters and accordingly, since the number of parts increases, the manufacturing cost increases.

An object of the present invention is to provide a vehicle air conditioning device that can save the space for installing constituent apparatuses of a vehicle by using a heater for multiple purposes and reduce the manufacturing cost.

Solution to the Problems

A vehicle air conditioning device according to the present invention for achieving the above object is a vehicle air conditioning device that includes a refrigerant circuit including a compressor, an indoor heat exchanger, an outdoor heat exchanger, and an expansion valve and performs heating operation for increasing temperature of air in a cabin by performing heat exchange in the indoor heat exchanger between a refrigerant and air to be supplied into the cabin, the vehicle air conditioning device including a heat medium circuit in which a heat medium heater for heating a heat medium and a constituent apparatus of the vehicle are connected, the heat medium circuit being able to heat the constituent apparatus by the heat medium that flows. The heat medium circuit includes a heat medium radiator that is connected in parallel to the constituent apparatus and causes the heat medium to radiate heat to the air to be supplied into the cabin. Heating assisting operation for heating the air to be supplied into the cabin is performed in a manner that the heat medium heated by the heat medium heater flows to the heat medium radiator without flowing on the constituent apparatus side while heating operation is performed.

Thus, the air to be supplied into the cabin is heated by the heat medium that is heated by the heat medium heater for heating the constituent apparatus of the vehicle and accordingly, the lack of heat radiation in the refrigerant circuit in the heating operation can be compensated for by the heat medium heater.

Effects of the Invention

By the vehicle air conditioning device according to the present invention, the lack of heat radiation in the refrigerant circuit in the heating operation can be compensated for by the heat medium heater. Therefore, the compensation for the lack of heat radiation in the refrigerant circuit and the heating of the constituent apparatus in the heating operation can be performed by one heater. As a result, the space for installing the constituent apparatus of the vehicle can be saved and the manufacturing cost can be reduced.

DESCRIPTION OF THE EMBODIMENTS

Figure 1:
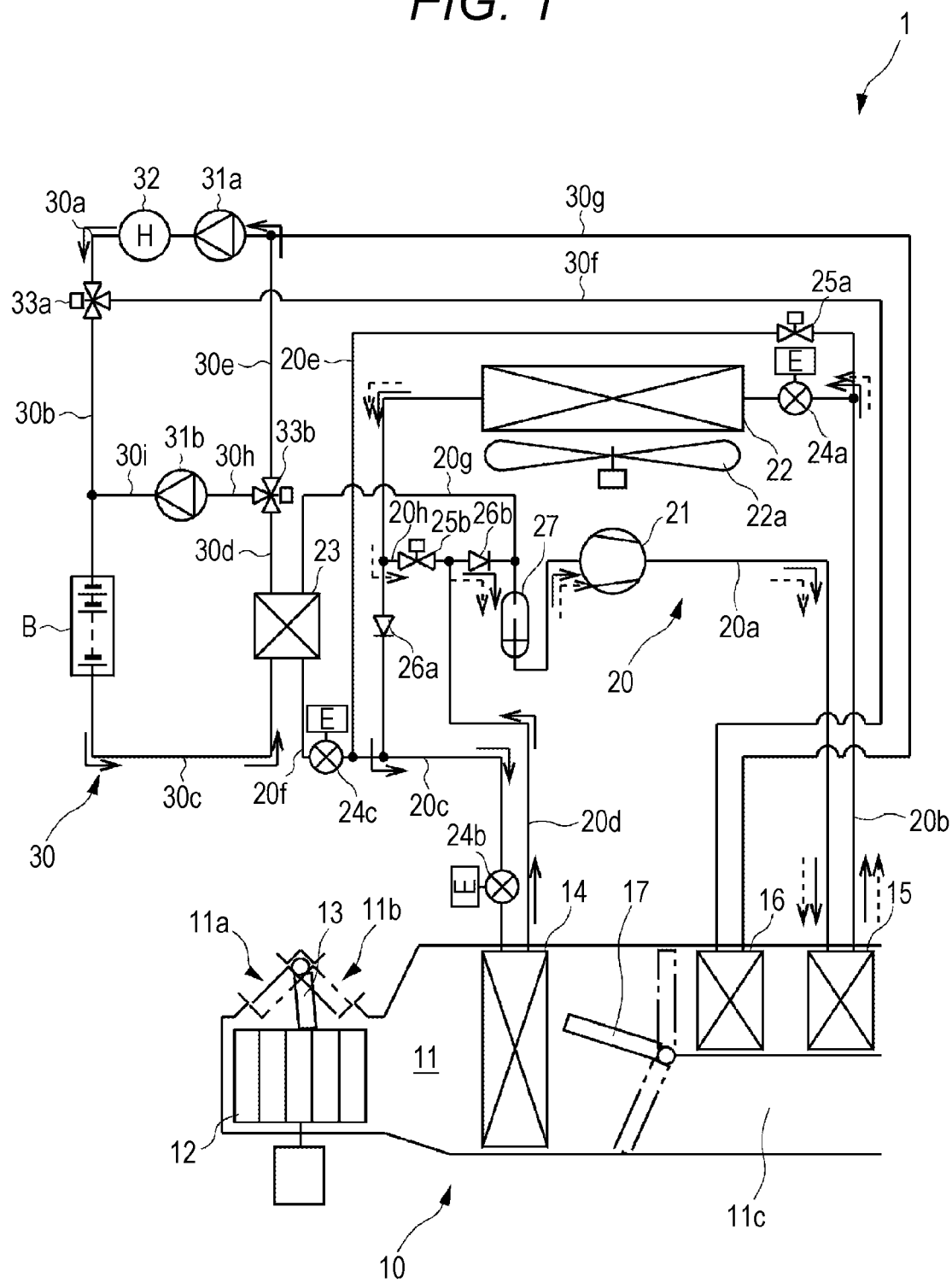
FIG. 1 is a schematic structure diagram of a vehicle air conditioning device illustrating one embodiment of the present invention.
Figure 2:
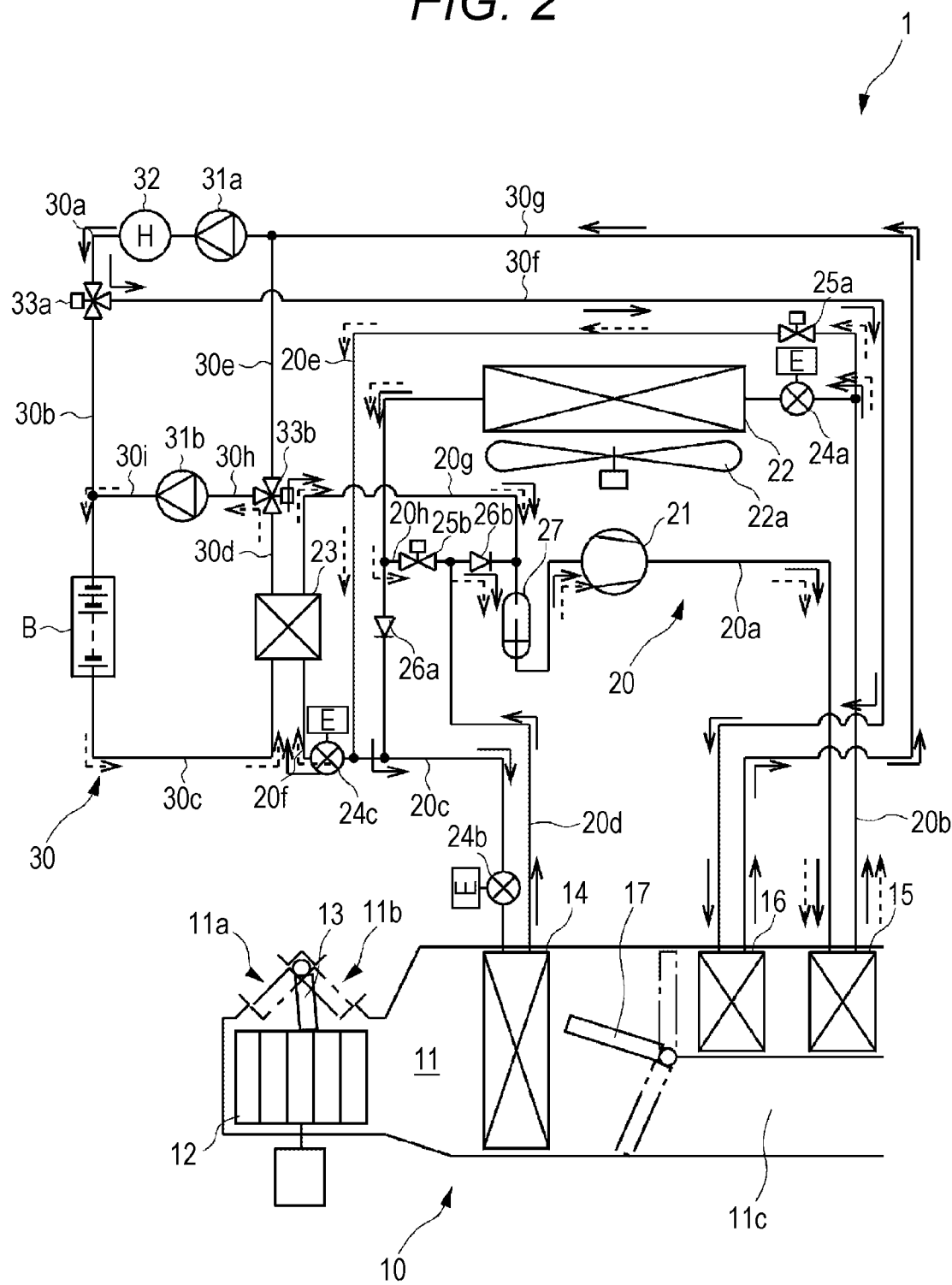
FIG. 2 is a schematic structure diagram of the vehicle air conditioning device illustrating battery cooling operation and heating assisting operation.

FIG. 1 and FIG. 2 illustrate one embodiment of the present invention.

A vehicle air conditioning device 1 according to the present invention is used for a vehicle that can travel by a driving force of an electric motor, such as an electric vehicle or a hybrid vehicle.

The vehicle includes an electric motor for travel, and a battery B for travel as a constituent apparatus for supplying electric power to the electric motor. The battery B radiates heat by the use. In addition, the battery B needs to be used in a predetermined temperature range in order to exhibit a predetermined performance. Therefore, the battery B needs to be cooled or heated in accordance with the temperature of the external air or use situations. For example, the battery B is desirably used in the range of 10° C. to 30° C.

This vehicle air conditioning device 1 includes an air conditioning unit 10 provided in the cabin of the vehicle, a refrigerant circuit 20 provided inside or outside the cabin, and a heat medium circuit 30 for circulating a heat medium that absorbs heat radiated from the battery B and heats the battery B as illustrated in FIG. 1.

The air conditioning unit 10 includes an air flow path 11 where air to be supplied into the cabin flows. One end side of the air flow path 11 includes an external air suction port 11a through which the air outside the cabin flows into the air flow path 11, and an internal air suction port 11b through which the air inside the cabin flows into the air flow path 11. The other end side of the air flow path 11 includes a foot blowing port, which is not illustrated, for blowing the air having flowed in the air flow path 11 toward the foot of an occupant, a ventilation blowing port, which is not illustrated, for blowing the air toward an upper body of the occupant, and a defrosting blowing port, which is not illustrated, for blowing the air toward a surface of the windshield of the vehicle on the cabin side.

One end side of the air flow path 11 includes a suction port switch dumper 13 that can open one of the external air suction port 11a and the internal air suction port 11b and close the other. The suction port switch dumper 13 can switch among an external air supply mode of closing the internal air suction port 11b and opening the external air suction port 11a, an internal air circulation mode of closing the external air suction port 11a and opening the internal air suction port 11b, and an internal and external air suction mode of opening the external air suction port 11a and the internal air suction port 11b by being positioned between the external air suction port 11a and the internal air suction port 11b.

One end side in the air flow path 11, an indoor fan 12 such as a sirocco fan is provided. By the indoor fan 12, the air flows from one end side to the other end side of the air flow path 11.

On an air flow downstream side of the indoor fan 12 in the air flow path 11, a heat sink 14 is provided. The heat sink 14 serves as an indoor heat exchanger for cooling and dehumidifying the air flowing in the air flow path 11. In addition, on the air flow downstream side of the heat sink 14 in the air flow path 11, a radiator 15 is provided. The radiator 15 serves as an indoor heat exchanger for heating the air flowing in the air flow path 11.

The radiator 15 is disposed on one side in an orthogonal direction of the air flow path 11, and on the other side in the orthogonal direction of the air flow path 11, a radiator bypass flow path 11c that detours the radiator 15 is formed. On one side in an orthogonal direction of the air flow path 11, between the heat sink 14 and the radiator 15, a heat medium radiator 16 is provided. The heat medium radiator 16 performs heat exchange between the air and the heat medium flowing in the heat medium circuit 30 so as to heat the air to be supplied into the cabin.

Between the heat sink 14 and the heat medium radiator 16 in the air flow path 11, an air mix dumper 17 is provided. The air mix dumper 17 adjusts the ratio of the air to be heated by the radiator 15 and the heat medium radiator 16 to the air passing the heat sink 14. The air mix dumper 17 adjusts the opening of the heat medium radiator 16 on an air flow upstream side by closing the air flow upstream side of one of the radiator bypass flow path 11c and the heat medium radiator 16 and opening the other or opening both the radiator bypass flow path 11c and the heat medium radiator 16 on the air flow upstream side of the heat medium radiator 16 and the radiator bypass flow path 11c. When the air mix dumper 17 closes the air flow upstream side of the heat medium radiator 16 in the air flow path 11 and opens the radiator bypass flow path 11c, the opening is 0%. When the air mix dumper 17 opens the air flow upstream side of the heat medium radiator 16 in the air flow path 11 and closes the radiator bypass flow path 11c, the opening is 100%.

The refrigerant circuit 20 includes the heat sink 14, the radiator 15, a compressor 21 for compressing the refrigerant, an outdoor heat exchanger 22 for performing heat exchange between the refrigerant and the air outside the cabin, a heat medium heat exchanger 23 for performing heat exchange between the refrigerant flowing in the refrigerant circuit 20 and the heat medium flowing in the heat medium circuit 30, first to third expansion valves 24a, 24b, and 24c that can adjust the valve opening degree between a fully closed state and a fully open state, first and second solenoid valves 25a and 25b for opening or closing the channel of the refrigerant, first and second check valves 26a and 26b for restricting the flowing direction of the refrigerant in the channel of the refrigerant, and an accumulator 27 that separates the gas refrigerant and the liquid refrigerant and prevents the liquid refrigerant from being sucked in the compressor 21. These elements are connected with an aluminum pipe or a copper pipe, for example. Examples of the refrigerant flowing in the refrigerant circuit 20 include R-134a.

Specifically, a refrigerant flow path 20a is formed by connecting the refrigerant inlet side of the radiator 15 to the refrigerant discharge side of the compressor 21. By connecting the refrigerant inlet side of the outdoor heat exchanger 22 to the refrigerant outlet side of the radiator 15, a refrigerant flow path 20b is formed. In the refrigerant flow path 20b, the first expansion valve 24a is provided. By connecting the refrigerant inlet side of the heat sink 14 to the refrigerant outlet side of the outdoor heat exchanger 22, a refrigerant flow path 20c is formed. In the refrigerant flow path 20c, the first check valve 26a and the second expansion valve 24b are provided in the order from the outdoor heat exchanger 22 side. By connecting the refrigerant suction side of the compressor 21 to the refrigerant outlet side of the heat sink 14, a refrigerant flow path 20d is formed. In the refrigerant flow path 20d, the second check valve 26b and the accumulator 27 are provided in the order from the heat sink 14 side. In addition, between the radiator 15 and the first expansion valve 24a in the refrigerant flow path 20b, a refrigerant flow path 20e is formed. The refrigerant flow path 20e detours the outdoor heat exchanger 22 and connects between the first check valve 26a and the second expansion valve 24b in the refrigerant flow path 20c. In the refrigerant flow path 20e, the first solenoid valve 25a is provided. By connecting the refrigerant inlet side of the heat medium heat exchanger 23 to the downstream side of the first solenoid valve 25a in the refrigerant flow path 20e, a refrigerant flow path 20f is formed. In the refrigerant flow path 20f, the third expansion valve 24c is provided. By connecting the second check valve 26b and the accumulator 27 in the refrigerant flow path 20d on the refrigerant outlet side of the heat medium heat exchanger 23, a refrigerant flow path 20g is formed. By connecting the heat sink 14 and the second check valve 26b in the refrigerant flow path 20d between the first check valve 26a and the outdoor heat exchanger 22 in the refrigerant flow path 20c, a refrigerant flow path 20h is formed. In the refrigerant flow path 20h, the second solenoid valve 25b is provided.

In addition, the outdoor heat exchanger 22 is a heat exchanger formed of a fin and a tube, and is disposed in a front-rear direction of the vehicle, which is the air flowing direction outside the cabin, for example in an engine compartment. Near the outdoor heat exchanger 22, an outdoor fan 22a is provided. The outdoor fan 22a supplies the air outside the cabin in the front-rear direction when the vehicle stops.

The heat medium circuit 30 includes the heat medium radiator 16, the heat medium heat exchanger 23, first and second heat medium pumps 31a and 31b for pumping the heat medium, a heat medium heater 32 for heating the heat medium flowing in the heat medium circuit 30, first and second medium cross valves 33a and 33b, and the battery B for vehicle traveling that stores the electric power and supplies the electric power to the electric motor for the vehicle traveling. These elements are connected with an aluminum pipe or a copper pipe, for example. Examples of the refrigerant flowing in the heat medium circuit 30 include an antifreeze solution such as ethylene glycol.

Specifically, by connecting a heat medium inlet port of the first heat medium cross valve 33a to a heat medium discharge side of the first heat medium pump 31a, a heat medium flow path 30a is formed. In the heat medium flow path 30a, the heat medium heater 32 is provided. By connecting the heat medium inlet side of the battery B to one of two heat medium outlet ports of the first heat medium cross valve 33a, a heat medium flow path 30b is formed. By connecting the heat medium inlet side of the heat medium heat exchanger 23 to the heat medium outlet side of the battery B, a heat medium flow path 30c is formed. By connecting a heat medium inlet port of the second heat medium cross valve 33b to the heat medium outlet side of the heat medium heat exchanger 23, a heat medium flow path 30d is formed. By connecting a heat medium suction side of the first heat medium pump 31a to one of two heat medium outlet ports of the second heat medium cross valve 33b, a heat medium flow path 30e is formed. By connecting the heat medium inlet side of the heat medium radiator 16 to the other heat medium outlet port of the first heat medium cross valve 33a while detouring the battery B and the heat medium heat exchanger 23, a heat medium flow path 30f is formed. By connecting the heat medium flow path 30e to the heat medium outlet side of the heat medium radiator 16, a heat medium flow path 30g is formed. The heat medium radiator 16 is connected to the heat medium circuit 30 in parallel to the battery B. By connecting the heat medium suction side of the second heat medium pump 31b to the other heat medium outlet port of the second heat medium cross valve 33b, a heat medium flow path 30h is formed. By connecting the heat medium flow path 30b to the heat medium discharge side of the second heat medium pump 31b, a heat medium flow path 30i is formed. The first heat medium cross valve 33a switches the destination with which the heat medium flow path 30a communicates, to the heat medium flow path 30b side or the heat medium flow path 30f side. The second heat medium cross valve 33b switches the destination with which the heat medium flow path 30d communicates, to the heat medium flow path 30e side or the heat medium flow path 30h side.

The vehicle air conditioning device 1 with the aforementioned structure adjusts the temperature and the humidity of the air in the cabin using the air conditioning unit 10 and the refrigerant circuit 20.

For example, in cooling operation for decreasing the temperature in the cabin, the air conditioning unit 10 drives the indoor fan 12 and sets the opening degree of the air mix dumper 17 to 0%. In the refrigerant circuit 20, the compressor 21 is driven in a state where the first expansion valve 24a is fully open, the second expansion valve 24b is set at a predetermined valve opening degree, the third expansion valve 24c is fully closed, the first solenoid valve 25a is closed, and the second solenoid valve 25b is closed.

Thus, as indicated by a solid line arrow in the refrigerant circuit 20 in FIG. 1, the refrigerant discharged from the compressor 21 flows in the order of the refrigerant flow path 20a, the radiator 15, the refrigerant flow path 20b, the outdoor heat exchanger 22, the refrigerant flow path 20c, the heat sink 14, and the refrigerant flow path 20d, and then is sucked in the compressor 21.

The refrigerant flowing in the refrigerant circuit 20 does not radiate heat in the radiator 15 because the opening degree of the air mix dumper 17 is 0%, and radiates heat in the outdoor heat exchanger 22 and absorbs heat in the heat sink 14.

The air flowing in the air flow path 11 exchanges heat with the refrigerant that absorbs heat in the heat sink 14, and thus the air is cooled and is blown into the cabin.

In addition, for example, in dehumidifying and cooling operation for decreasing the temperature and the humidity in the cabin, the opening degree of the air mix dumper 17 in the air conditioning unit 10 is set to the opening degree more than 0% in the flow path of the refrigerant in the refrigerant circuit 20 in the cooling operation.

Thus, the refrigerant flowing in the refrigerant circuit 20 radiates heat in the radiator 15 and the outdoor heat exchanger 22, and absorbs heat in the heat sink 14.

The air flowing in the air flow path 11 exchanges heat with the refrigerant that absorbs heat in the heat sink 14 so as to be dehumidified and cooled, and then is heated up to target blowing temperature in the radiator 15, and blown into the cabin.

Furthermore, for example, in dehumidifying and heating operation for decreasing the humidity and increasing the temperature in the cabin, the first expansion valve 24a is set to have a predetermined valve opening degree smaller than the fully open state in the flow path of the refrigerant in the refrigerant circuit 20 in the cooling operation. In addition, the opening degree of the air mix dumper 17 in the air conditioning unit 10 is set to more than 0%.

Thus, the refrigerant flowing in the refrigerant circuit 20 radiates heat in the radiator 15, and absorbs heat in the outdoor heat exchanger 22 and the heat sink 14.

The air flowing in the air flow path 11 in the air conditioning unit 10 exchanges heat with the refrigerant that absorbs heat in the heat sink 14 so as to be dehumidified and cooled, and then is heated up to target blowing temperature in the radiator 15, and blown into the cabin.

Moreover, in heating operation for increasing the temperature in the cabin, the air conditioning unit 10 drives the indoor fan 12 and sets the air mix dumper 17 to the opening degree more than 0%. In addition, in the refrigerant circuit 20, the compressor 21 is driven in a state where the first expansion valve 24a is set at a predetermined valve opening degree smaller than the fully open state, the second expansion valve 24b and the third expansion valve 24c are fully closed, the first solenoid valve 25a is closed, and the second solenoid valve 25b is opened.

Thus, as indicated by a dashed line arrow in FIG. 1, the refrigerant discharged from the compressor 21 flows in the order of the refrigerant flow path 20a, the radiator 15, the refrigerant flow path 20b, the outdoor heat exchanger 22, a part of the refrigerant flow path 20c, the refrigerant flow path 20h, and a part of the refrigerant flow path 20d, and then is sucked in the compressor 21.

The refrigerant flowing in the refrigerant circuit 20 radiates heat in the radiator 15 and absorbs heat in the outdoor heat exchanger 22.

The air flowing in the air flow path 11 in the air conditioning unit 10 does not exchange heat with the refrigerant in the heat sink 14 but exchanges heat with the refrigerant radiating heat in the radiator 15, and thus is heated and blown into the cabin.

The battery B may need to be heated, for example when the travel of the vehicle is started in a low-temperature environment. When the battery B needs to be heated, the vehicle air conditioning device 1 performs battery heating operation.

In the battery heating operation, the third expansion valve 24c is fully closed in the refrigerant circuit 20. In the battery heating operation, moreover, in the heat medium circuit 30, the flow path of the first heat medium cross valve 33a is set to the heat medium flow path 30b side, the flow path of the second heat medium cross valve 33b is set to the heat medium flow path 30e side, and the first heat medium pump 31a and the heat medium heater 32 are driven without driving the second heat medium pump 31b.

Thus, as indicated by a solid line arrow in the heat medium circuit 30 in FIG. 1, the refrigerant discharged from the first heat medium pump 31a flows in the order of the heat medium flow path 30a, the heat medium flow path 30b, the battery B, the heat medium flow path 30c, the heat medium heat exchanger 23, and the heat medium flow paths 30d and 30e, and is sucked in the first heat medium pump 31a.

The heat medium flowing in the heat medium circuit 30 is heated by the heat medium heater 32. The battery B is heated by the heat medium heated by the heat medium heater 32. The heat medium flowing in the heat medium circuit 30 does not exchange heat with the refrigerant because the refrigerant does not flow in the refrigerant side flow path of the heat medium heat exchanger 23.

When the vehicle travels, the battery B emits heat, so that the battery B may need to be cooled. Therefore, if the battery B needs to be cooled while the temperature and the humidity in the cabin are adjusted using the air conditioning unit 10 and the refrigerant circuit 20, the vehicle air conditioning device 1 performs battery cooling operation for cooling the battery B.

In the battery cooling operation, the third expansion valve 24c is set to a predetermined valve opening degree in the refrigerant circuit 20 performing operation other than the heating operation, and the third expansion valve 24c is set to a predetermined valve opening degree and the first solenoid valve 25a is opened in the refrigerant circuit 20 performing the heating operation. In the battery cooling operation, in the heat medium circuit 30, the flow path of the second heat medium cross valve 33b communicates with the heat medium flow path 30h side and the second heat medium pump 31b is driven.

The refrigerant flowing in the refrigerant circuit 20 flows in the refrigerant flow path 20f, enters the heat medium heat exchanger 23 and absorbs heat, flows in the refrigerant flow path 20g, and merges with the refrigerant flow path 20d, and then is sucked in the compressor 21 as illustrated in FIG. 2.

On the other hand, in the heat medium circuit 30, as indicated by a dashed line arrow in the heat medium circuit 30 in FIG. 2, the heat medium discharged from the second heat medium pump 31b flows in the order of the heat medium flow paths 30i and 30b, the battery B, the heat medium flow path 30c, the heat medium heat exchanger 23, the heat medium flow paths 30d and 30h and is sucked in the second heat medium pump 31b as a first circulation flow path. The heat medium flowing in the heat medium circuit 30 is heated by the heat emitted from the battery B, and exchanges heat with the refrigerant that absorbs heat in the heat medium heat exchanger 23, so that the heat medium is cooled.

The battery B is cooled by the heat medium that has exchanged heat with the refrigerant through the heat medium heat exchanger 23.

In the heating operation under the low-temperature environment, the heat radiation from the radiator 15 may be insufficient and it may be impossible to obtain the set temperature in the cabin. In view of this, if the heat radiation from the radiator 15 is insufficient while the heating operation is performed using the air conditioning unit 10 and the refrigerant circuit 20, the vehicle air conditioning device 1 performs heating assisting operation for assisting the heating operation.

In the heating assisting operation, in the heat medium circuit 30, the flow path of the first heat medium cross valve 33a communicates with the heat medium flow path 30f side and the first heat medium pump 31a and the heat medium heater 32 are driven.

As indicated by a solid line arrow in the heat medium circuit 30 in FIG. 2, the heat medium discharged from the first heat medium pump 31a flows in the order of the heat medium flow path 30a, the heat medium heater 32, the heat medium flow path 30f, the heat medium radiator 16, and the heat medium flow path 30g and is sucked in the first heat medium pump 31a as a second circulation flow path.

The heat medium flowing in the heat medium circuit 30 is heated by the heat medium heater 32. The heat medium heated by the heat medium heater 32 radiates heat in the heat medium radiator 16 without flowing on the battery B side.

The air flowing in the air flow path 11 in the air conditioning unit 10 is heated by exchanging heat with the heat medium that radiates heat in the heat medium radiator 16, is heated up to the target blowing temperature in the radiator 15, and then is blown into the cabin.

In the heat medium circuit 30, as illustrated in FIG. 2, the first circulation flow path for the battery cooling operation and the second circulation flow path for the heating assisting operation can be set at the same time to enable the flow of the heat medium. In the heat medium circuit 30, just one of the first heat medium pump 31a and the second heat medium pump 31b may be driven so that the heat medium flows to just one of the first circulation flow path and the second circulation flow path.

When the compressor 21 stops and the flow of the refrigerant in the refrigerant circuit 20 stops due to the occurrence of a trouble or the like in the heating operation, preliminary heating operation is performed using the heat medium circuit 30. In the preliminary heating operation, the heat medium heated by the heat medium heater 32 is made to radiate heat in the heat medium radiator 16 without flowing on the battery B side in a manner similar to the heating assisting operation.

In this manner, by the vehicle air conditioning device according to the present embodiment, the heat medium heated by the heat medium heater 32 in the heat medium circuit 30 during the heating operation is made to flow in the heat medium radiator 16 without flowing on the battery B side; thus, the heating assisting operation for heating the air to be supplied into the cabin is performed.

Thus, the heat medium heater 32 can compensate for the lack of heat radiation in the refrigerant circuit 20 in the heating operation; therefore, one heat medium heater 32 can perform the compensation for the lack of heat radiation in the refrigerant circuit 20 and the heating of the battery B. Accordingly, the space for installing the constituent apparatus of the vehicle can be saved and the manufacturing cost can be reduced.

In addition, the heat medium heat exchanger 23 for cooling the heat medium by exchanging heat with the refrigerant flowing in the refrigerant circuit 20 is connected to the heat medium circuit 30.

Thus, one heat medium circuit 30 can heat and cool the battery B, and therefore the space for installing the constituent apparatus of the vehicle can be saved and the manufacturing cost can be reduced.

Moreover, in the heat medium circuit 30, the first circulation flow path for circulating the heat medium between the battery B and the heat medium heat exchanger 23 and the second circulation flow path for circulating the heat medium between the heat medium heater 32 and the heat medium radiator 16 can be set at the same time.

Thus, the compensation for the lack of heat radiation in the refrigerant circuit 20 and the cooling of the battery B in the heating operation can be performed at the same time, and the riding comfort of the occupant can be improved while the performance of the vehicle is maintained.

In addition, the heat medium radiator 16 is disposed on the upstream side of the radiator 15 in the air flow path 11.

Thus, the air with relatively low temperature before being heated in the radiator 15 can be heated by the heat medium; therefore, a heat medium heater with high output for heating the heat medium to high temperature is unnecessary and the manufacturing cost can be reduced.

Moreover provided is the preliminary heating function for heating the air to be supplied into the cabin by making the heat medium, which is heated by the heat medium heater 32, flow to the heat medium radiator 16 while the flow of the refrigerant in the refrigerant circuit 20 is stopped.

Thus, even when the compressor 21 stops and the flow of the refrigerant in the refrigerant circuit 20 stops due to the occurrence of a trouble or the like, the heat medium heater 32 can continue to heat the cabin, and therefore, the situation where the cabin cannot be heated in the low-temperature environment can be avoided.

Note that in the embodiment, the battery B is described as the constituent apparatus of the vehicle whose temperature needs to be adjusted; however, the constituent apparatus is not limited to the battery. Examples of the constituent apparatus of the vehicle whose temperature needs to be adjusted include a power source device such as a converter, an electronic component, and an electric motor.

In the embodiment, the heat medium flowing in the heat medium circuit 30 is the antifreeze solution; however, the heat medium is not limited to the antifreeze solution. For example, water, oil, or the like may be used as the heat medium if these heat mediums can exchange heat with the refrigerant in the heat medium heat exchanger 23 and at the same time exchange heat with the air in the heat medium radiator 16.

Furthermore, in the embodiment, the second heat medium pump 31b is driven in the heat medium circuit 30 in the battery cooling operation; however, the embodiment is not limited to this structure. In the battery cooling operation, in the heat medium circuit 30, the flow path of the first heat medium cross valve 33a may be set to the heat medium flow path 30b side, the flow path of the second heat medium cross valve 33b may be set to the heat medium flow path 30e side, and the first heat medium pump 31a may be driven without driving the second heat medium pump 31b or the heat medium heater 32.

LIST OF THE REFERENCE NUMERALS

1 Vehicle air conditioning device
10 Air conditioning unit
11 Air flow path
14 Heat sink
15 Radiator
16 Heat medium radiator
20 Refrigerant circuit
21 Compressor
22 Outdoor heat exchanger
23 Heat medium heat exchanger
30 Heat medium circuit
32 Heat medium heater
B Battery

What is claimed is:

1. A vehicle air conditioning device that includes a refrigerant circuit including a compressor, an indoor heat exchanger, an outdoor heat exchanger, and an expansion valve and performs heating operation for increasing temperature of air in a cabin by performing heat exchange in the indoor heat exchanger between a refrigerant and air to be supplied into the cabin, the vehicle air conditioning device comprising a heat medium circuit in which a heat medium heater for heating a heat medium and a constituent apparatus of the vehicle are connected, the heat medium circuit being able to heat the constituent apparatus by the heat medium that flows, wherein the heat medium circuit includes a heat medium radiator that is connected in parallel to the constituent apparatus and causes the heat medium to radiate heat to the air to be supplied into the cabin, and heating assisting operation for heating the air to be supplied into the cabin is performed in a manner that the heat medium heated by the heat medium heater flows to the heat medium radiator without flowing on the constituent apparatus side while heating operation is performed.

2. The vehicle air conditioning device according to claim 1, wherein the heat medium circuit is connected to a heat medium heat exchanger that cools the heat medium by performing heat exchange with the refrigerant flowing in the refrigerant circuit.

3. The vehicle air conditioning device according to claim 2, wherein the heat medium circuit is able to set at the same time, a first circulation flow path for circulating the heat medium between the constituent apparatus and the heat medium heat exchanger and a second circulation flow path for circulating the heat medium between the heat medium heater and the heat medium radiator.

4. The vehicle air conditioning device according to claim 1, wherein the heat medium radiator is disposed on an upstream side of the indoor heat exchanger functioning as the radiator in a flow path of the air to be supplied into the cabin.

5. The vehicle air conditioning device according to claim 1, to further comprising a preliminary heating function for heating the air to be supplied into the cabin in a manner that the heat medium heated by the heat medium heater flows in the heat medium radiator while the flow of the refrigerant in the refrigerant circuit stops.

* * * * *

UNITED STATES PATENT AND TRADEMARK OFFICE
CERTIFICATE OF CORRECTION

| | |
|---|---|
| PATENT NO. | : 11,618,301 B2 |
| APPLICATION NO. | : 17/273613 |
| DATED | : April 4, 2023 |
| INVENTOR(S) | : Tetsuya Ishizeki et al. |

It is certified that error appears in the above-identified patent and that said Letters Patent is hereby corrected as shown below:

In the Claims

Column 10, Lines 56-57, "according to claim 1, to further comprising" should read --according to claim 1, further comprising--.

Signed and Sealed this
Seventeenth Day of September, 2024

Katherine Kelly Vidal
Director of the United States Patent and Trademark Office